(No Model.)

A. F. SCHULZE.
CLAMP.

No. 562,922. Patented June 30, 1896.

WITNESSES:
P. H. Eagles.
L. Douville.

INVENTOR
August F. Schulze.
BY John A. Wiedersheim,
ATTORNEY.

ANDREW B.GRAHAM, PHOTO-LITHO. WASHINGTON, D.C.

UNITED STATES PATENT OFFICE.

AUGUST F. SCHULZE, OF BURLINGTON, NEW JERSEY, ASSIGNOR OF ONE-HALF TO GEORGE J. BERNASCO, OF SAME PLACE.

CLAMP.

SPECIFICATION forming part of Letters Patent No. 562,922, dated June 30, 1896.

Application filed November 11, 1895. Serial No. 568,547. (No model.)

*To all whom it may concern:*

Be it known that I, AUGUST F. SCHULZE, a citizen of the United States, residing at Burlington, in the county of Burlington, State of New Jersey, have invented a new and useful Improvement in Clamps for Bicycle and other Valves, which improvement is fully set forth in the following specification and accompanying drawings.

My invention has for its object the secure fastening of a bicycle or other valve to the nozzle or tube which directs the air into the tire of the wheel thereof.

The invention consists of a yoke which is adapted to encircle said nozzle, and be closed and compressed thereagainst, thus clamping the nozzle to the shell of the valve in a practical, serviceable, and efficient manner.

Figure 1:
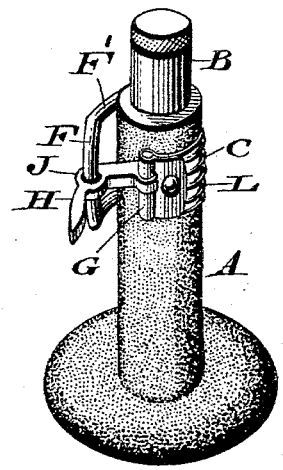
Figure 2:
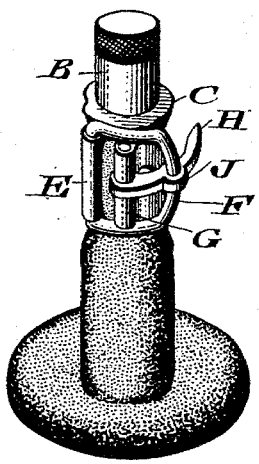
Figure 3:
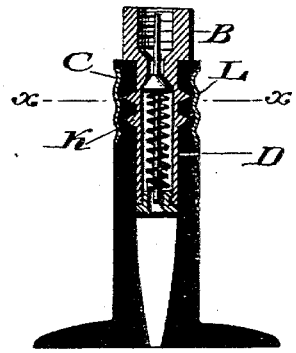
Figure 4:
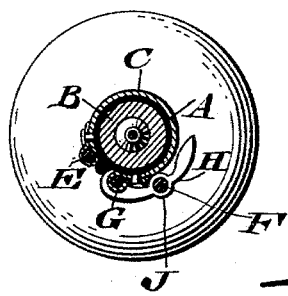

Figures 1 and 2 represent perspective views of a clamp for a bicycle-valve embodying my invention. Fig. 3 represents a vertical section thereof. Fig. 4 represents a horizontal section on line $x\ x$, Fig. 3.

Similar letters of reference indicate corresponding parts in the several figures.

Referring to the drawings, A designates a nozzle which is formed of flexible, elastic, or other compressible material, and adapted to be attached to the pneumatic tire of a bicycle-wheel in any suitable manner, and having in the outer end thereof the valve B, to which may be attached an air-pump for inflating said tire, as usual in such cases.

C designates a yoke or band of pliable metal or material which partly encircles the portion of the nozzle A which receives part of the shell D of the valve, the ends of said yoke being separated. Pivoted to one end of the yoke, as at E, is the clevis F, and pivoted to the other end of said yoke, as at G, is the lever H, in which latter is an eye or opening J intermediate of its ends, the same freely receiving the outer cross-bar of the clevis F.

It will be seen that when the yoke is located on the nozzle, as shown in Fig. 1, and the lever H properly turned, in the present case to the right, as in Fig. 2, it is evident that, as the cross-bar G of the clevis is mounted in said lever, the two ends of the yoke will be brought together, whereby the yoke will be closed tightly against the nozzle, thus compressing the latter upon the shell D, and firmly securing the valve in said nozzle.

As the lever and clevis have different centers, and the clevis is mounted upon the said lever, the latter acts as an eccentric, so as to draw forward said clevis, and at the same time move the axial end of the lever toward the axial end of the clevis, by which provision both ends of the yoke are brought together, so as to quickly close said yoke, and cause it to hold uniformly and most powerfully on the nozzle which it embraces. When the lever has been thrown inwardly, or to the right, to full extent, it passes its center, and so retains its closed position, thus controlling the clevis, and preventing outward motion of the same, and consequently preventing an opening of the yoke.

In order to increase the hold of the nozzle upon the shell of the valve, said shell has its exterior formed with corrugations K, and the yoke is interlocked with the exterior of the nozzle, so that slipping of the parts on each other is prevented.

It is evident that the clamp is applicable for securing a valve other than that intended for tires of bicycles.

Having thus described my invention, what I claim as new, and desire to secure by Letters Patent, is—

1. A clamp for a bicycle-valve, consisting of a split tubular yoke, a lever pivotally connected with one end thereof, said lever having an eye intermediate of its ends, and a clevis pivoted to the other end of said yoke and having a cross-bar thereon held in said eye on said lever, said parts being combined substantially as described.

2. A flexible nozzle, a valve-shell with end inserted in said nozzle, a yoke partly encircling said nozzle, where receiving said shell, a lever pivoted to one end of said yoke, and a clevis pivoted to the other end thereof, said lever having an eye connecting it with a cross-bar on said clevis, said parts being combined substantially as described.

3. A lever, a corrugated yoke on which one end of said lever is mounted, and a clevis pivoted to the other end of said yoke, said lever having an eye which receives a cross-bar of said clevis, in combination with a valve having a corrugated shell which enters a nozzle embraced by said yoke, substantially as described.

AUGUST F. SCHULZE.

Witnesses:
 ROBT. POWELL,
 L. L. LEAVER.